2,978,406
PRODUCTION OF ODORLESS NAPHTHAS

George W. Ayers, Chicago, and William A. Krewer, Arlington Heights, Ill., assignors to The Pure Oil Company, Chicago, Ill., a corporation of Ohio No Drawing. Filed July 7, 1959, Ser. No. 825,408

11 Claims. (Cl. 208—289)

This invention relates to the preparation of industrial odorless naphthas. More particularly, this invention relates to the prevention of the formation of odor during the distillation of essentially odorless naphthas (including heavy alkylates and fractions thereof) by conducting the distillation in the presence of phenothiazine. Odorless naphthas find application in many industrial services and processes because of their distinctive qualities and advantages, such as lack of odor and toxicity, good solvent properties, low cost, and availability. Naphthas may be defined as hydrocarbon mixtures, usually of comparatively narrow boiling range with end boiling points below 600° F., and derived from the fractional distillation of petroleum or of coal-tar oils, or from the fractional distillation of synthetic hydrocarbon products. Naphthas range broadly in their chemical and physical properties, but can be classified as straight-run petroleum naphthas, aromatic naphthas, synthetic naphthas, etc., including alkylates, heavy alkylates or fractions thereof. The present invention can be applied to straight-run petroleum naphthas boiling above approximately 340° F., that have been rendered essentially odorless by removal of aromatic hydrocarbon components, for example by treatment with silica gel, but finds particular application in the treatment of synthetic naphthas, such as heavy alkylates or fractions thereof, and the preparation of odorless naphthas from heavy alkylates.

Although naphthas consist essentially of mixtures of hydrocarbons, certain of the hydrocarbons may show slight instability or may exhibit oxidation during fractional distillation. Moreover, various impurities such as organic oxygen compounds may be present in small amounts in such naphthas after their preparation by fractional distillation of synthetic materials such as heavy alkylates. The preparation of odorless naphthas, particularly naphthas of the higher boiling ranges and heavy alkylate fractions, which are free from odor and which also remain odor-free during storage or use over extended periods of time, has been heretofore an uncertain and tedious operation. One batch of odorless naphtha may be satisfactory from the odor standpoint, while another batch prepared in apparently a similar operation may be wholly unsuitable as an odorless material. There are many processes disclosed in the prior art which relate to removing odorous materials from hydrocarbon materials and naphthas. These are usually classified as sweetening processes wherein deleterious sulfur compounds are chemically modified, removed, or adsorbed. For purposes of the present invention, these prior art refining and sweetening methods, whether chemical or physical, when applied to essentially odorless heavy naphthas or alkylate fractions, are generally found to be inadequate for the removal of odor, or the prevention of odor during distillation (as when an essentially odor-free naphtha is distilled), or the prevention of odor formation during storage.

In accordance with the present invention, it has been found that the distillation of essentially odorless naphthas or heavy alkylates in the presence of small amounts of phenothiazine prevents the formation of odor during distillation, and results in a product which is uniformly satisfactory and stable. The instant invention makes the preparation of odorless, stable naphthas a more uniform and dependable operation.

This invention does not relate to the removal of odor from naphthas or heavy alkylates which already have decomposed to the point of being odorous, but rather is directed to the prevention of odor formation during the distillation of those materials which are already essentially odor-free, but have a decided tendency to go off-odor during distillation or during storage. Consequently, those processes in the prior art which are concerned with chemical refining, adsorbing, and sweetening, as applied to cracked naphthas or naphthas containing sulfur compounds which are notoriously odorous, have no bearing on the present invention. It has further been found that although some essentially odorless naphthas can be distilled under reduced pressure, or in the presence of steam, without appreciable odor development, the results are erratic and such processing cannot be depended upon for the uniform production of odorless naphthas of marketable quality. By incorporating small amounts of phenothiazine during distillation under reduced pressure, and/or in the presence of an inert gas such as nitrogen or steam, the resulting products are uniformly odorless.

In carrying out the invention, an amount of phenothiazine sufficient to prevent or inhibit the formation of odorous compounds is used. For this purpose between about 5 and 1000 lbs. of phenothiazine per 1000 bbls. of naphtha may be used. In general, however, small amounts ranging from about 5 to 10 lbs. of phenothiazine per 1000 bbls. of heavy alkylate are used. The upper concentration limit is dictated only by the economics of the process. The preferred concentration of phenothiazine for use in the distillation of heavy alkylates, which are particularly difficult to distill without odor development, ranges from about 10 to 50 lbs. per 1000 bbls. of heavy alkylate.

Accordingly, a primary object of this invention is to provide a process for preventing the formation of odor in essentially odorless naphthas, such as heavy alkylates and fractions thereof, during distillation. Another object of this invention is to provide a method of preventing the formation of odor and insuring odor stability in essentially odorless naphthas and heavy alkylates fractions by distilling them in the presence of a sufficient amount of phenothiazine to insure an odor-free and stable product.

Another object of this invention is to provide a method of preventing the formation of odor during the distillation of essentially odor-free naphthas and alkylate fractions by distilling them in the presence of small amounts of phenothiazine under reduced pressure, with or without the presence of an inert gas.

Phenothiazine has the following formula:

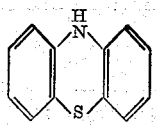

We have found that not all compounds known to be oxidation inhibitors will function as odor-prevention agents under the conditions of distilltion normally applied to naphthas. It has previously been established that certain phenols and cresols, and even aniline have oxidation-inhibiting properties at room temperature, but they are not effective to prevent odor at the distillation temperatures of this invention and produce odorous products which cannot be rated as odorless naphthas. Mono-, di-, and tertiary aliphatic amines, typical of which is triamylamine, are well-known color inhibitors for various products, but they are not satisfactory for the purpose of producing odor-free and odor-stable naphthas or alkylates. Also, most special petroleum fractions or derivatives known to have oxidation-inhibiting properties are not satisfactory for the present purpose. Petroleum phenols and tar acids, for example, do not give products having passable odors when used with essentially odorless naphthas, heavy alkylates, and heavy alkylate fractions in accordance with this invention.

The odor-prevention agents used in the distillation must not break down at the naphtha distillation temperatures, must be free of odor themselves, and should not distill with the naphtha, with or without the use of steam or an inert gas during distillation. Accordingly, an imposing list of high-molecular-weight amines, normally considered to be oxidation inhibitors, is not suitable for the purposes of the present invention. This list includes diphenylamine, quinoline, and many tertiary aliphatic and aryl amines, as for example triphenylamine. Phenothiazine has been found to be unique for this reaction because it does not decompose during the distillation, it is effective either in the presence or absence of steam or an inert diluent, it has no odor, and it does not distill over into the product.

The distillation itself may be conducted at atmospheric or reduced pressures with small amounts of phenothiazine. For example, the distillation may be conducted at pressures in the order of one to 300 mm. of mercury. Any known form of distillation apparatus may be used and it is not necessary to take any special precautions as to the materials of construction of the distillation apparatus.

The essentially odorless naphthas and heavy alkylates that can be benefited by the application of this invention have initial boiling points above about 340° to 350° F. The end boiling point of the naphtha or heavy alkylate is about 400° to 600° F., or even higher. Heavy naphthas coming within this boiling range are obtained from such sources as fractions from the silica gel refining of petroleum straight-run fractions, or heavy alkylates (or fractions thereof) obtained from alkylates. Alkylates can be produced by the acid alkylation of alkanes with olefins. An example of such a process is the hydrofluoric acid alkylation of isobutane with isobutylene. The "heavy alkylate" from such an alkylate product is the bottoms portion distilling above 340° to 350° F. resulting from the fractionation of the entire alkylate product. The following table gives the distillation characteristics of several heavy alkylates and naphthas which may be used in the present invention.

This invention is illustrated by the following examples:

Example 1

A 40-cc. portion of heavy alkylate (bottoms with an initial boiling point of approximately 350° F. from the distillation of total alkylate manufactured by the sulfuric acid process), containing 150 lbs. of phenothiazine per 1000 bbls., was distilled at an absolute pressure of approximately 2 mm. of Hg, taking the 80% overhead as odorless naphtha (boiling range approximately 350–400° F. under atmospheric pressure). This odorless naphtha was satisfactory for commercial use.

Another 40-cc. portion of the heavy alkylate, containing no phenothiazine, was distilled under the same conditions. The distillate in this case was inferior in odor quality to the distillate obtained when phenothiazine was present during the distillation and was unfit for commercial use.

Example 2

A 100-cc. portion of heavy alkylate (bottoms with an initial boiling point of approximately 350° F. from the distillation of total alkylate manufactured by the hydrofluoric acid process), containing 50 lbs. of phenothiazine per 1000 bbls., was steam distilled, keeping the bottoms temperature at or under 212° F. at all times. The 80% overhead product was an odorless naphtha (approximately 350° to 400° F. boiling range) of good odor quality. When the essentially odorless heavy alkylate was distilled under the same conditions, but without phenothiazine present, the 80% distillate was a product of poor odor quality.

Example 3

To 100-cc. of heavy alkylate (bottoms with an initial boiling point of approximately 350° F. from the distillation of total alkylate manufactured by the sulfuric acid process) was added 50 lbs./1000 bbl. of phenothiazine and the mixture was distilled with steam, keeping the temperature of the mixture under 212° F. during the distillation. The distillate, obtained in 80% yield, had a boiling range of approximately 350–400° F., and was practically odorless and therefore marketable as odorless mineral spirits.

A similar distillation carried out without phenothiazine yielded a distillate of approximately 350–400° F. boiling range which had a slightly unpleasant odor. This distillate was not suitable from the odor standpoint for marketing as odorless mineral spirits.

Example 4

A mixture of 100 cc. of heavy alkylate (bottoms with an initial boiling point of approximately 350° F. from the distillation of total alkylate manufactured by the sul-

TESTS ON REPRESENTATIVE ODORLESS NAPHTHAS AND HEAVY ALKYLATES

| API Grav. | Distillation | | | | | | | | | | | | | | | | Odor |
|---|---|---|---|---|---|---|---|---|---|---|---|---|---|---|---|---|---|
| | IBP | 5% | 10% | 20% | 30% | 40% | 50% | 60% | 70% | 80% | 90% | 95% | E.P. | Percent Rec. | Percent Res. | Percent Loss | |
| 54.0 [1] | 347 | 354 | 356 | 358 | 360 | 363 | 366 | 369 | 374 | 383 | 414 | 466 | 517 | 98.0 | 1.6 | 0.4 | slight (essentially odorless). |
| 54.5 [1] | 352 | 358 | 360 | 360 | 361 | 362 | 362 | 363 | 364 | 366 | 370 | 377 | 393 | 98.8 | 1.2 | 0.0 | Do. |
| 53.6 [2] | 360 | 367 | 368 | 369 | 369 | 370 | 371 | 372 | 373 | 376 | 380 | 388 | 413 | 98.6 | 1.2 | 0.2 | Do. |
| 51.4 [2] | 372 | 378 | 380 | 382 | 385 | 388 | 392 | 397 | 408 | 425 | 481 | 540 | 573 | 99.0 | 1.0 | 0.0 | Do. |
| 51.4 [2] | 362 | 366 | 368 | 371 | 373 | 376 | 381 | 386 | 398 | 416 | 468 | 509 | 543 | 98.1 | 1.4 | 0.5 | Do. |
| 55.4 [1] | 351 | 354 | 355 | 356 | 357 | 358 | 359 | 360 | 362 | 365 | 368 | 372 | 385 | 98.7 | 1.3 | 0.0 | Do. |
| 54.1 [1] | 355 | 359 | 360 | 363 | 364 | 367 | 369 | 373 | 379 | 388 | 418 | 468 | 512 | 98.4 | 1.1 | 0.5 | Do. |
| 55.2 [1] | 348 | 352 | 353 | 355 | 356 | 357 | 359 | 361 | 363 | 365 | 370 | 377 | 406 | 98.8 | 1.2 | 0.0 | Do. |

[1] Made from alkylate produced by the hydrofluoric acid process.
[2] Made from alkylate produced by the sulfuric acid process.

furic acid process) and 50 lb./1000 bbl. of diphenylamine was distilled with steam, keeping the temperature of the mixture under 212° F. during the distillation. The distillate, obtained in 78% yield and having a boiling range of approximately 350–400° F., had a very slightly unpleasant odor and was not suitable for marketing as odorless mineral spirits.

*Example 5*

A mixture of 100 cc. of heavy alkylate (bottoms with an initial boiling point of approximately 350° F. from the distillation of total alkylate manufactured by the sulfuric acid process) and 50 lb./1000 bbl. of triphenylamine was distilled with steam, keeping the temperature of the mixture under 212° F. during the distillation. The distillate, obtained in 81% yield and having a boiling range of approximately 350–400° F., had a very slightly unpleasant odor and was not suitable for marketing as odorless mineral spirits.

As seen from the foregoing experiments, phenothiazine, among the high-boiling amines, is unique in its property of preventing the formation of odor during the distillation of essentially odorless naphthas and heavy alkylates. Since phenothiazine has a boiling point of 699.8° F. it remains in the bottoms during the distillation to produce an odorless naphtha distillate. The odorless product can be inhibited against odor formation during storage by the addition of about 0.1 to 50 lbs. of phenothiazine per 1,000 bbls. of naphtha. The distillation may be carried out batchwise or continuously. In continuous operation, a phenothiazine concentrate in the material being distilled, or in other liquid which does not contribute to the odor of the finished naphtha, is added continuously to the feed by means of a suitable device such as a proportioning pump. When the phenothiazine is added in this manner to a total alkylate during the distillation to prepare a heavy alkylate bottoms, it is usually not necessary to add additional phenothiazine to the heavy alkylate bottoms during its distillation to produce further odorless fractions.

The amount of phenothiazine used per amount of naphtha will be subject to considerable variation, depending upon the amount of odorous or odor-forming compounds present in the naphtha to be treated. At least a stoichiometric amount of phenothiazine to react with or counteract the odorous compound in the naphtha should be used. An excess over the stoichiometric amount is recommended. More specifically, between about .01 to 5.0 lbs. of phenothiazine per 100 bbls. of naphtha may be used.

The naphthas that can be treated in accordance with this invention include, (1) heavy alkylates or heavy alkylate fractions boiling from 300° F. to as high as 600° F. and which contain small amounts or traces of odorous materials arising during manufacturing or processing steps, or during storage; and (2) petroleum fractions boiling from about 300° F. to 600° F. which have been essentially denuded of their aromatic content by treatment with silica gel. The invention has particular application to naphthas boiling in the range of 300–525° F. and including heavy alkylate fractions prepared by the distillation of heavy alkylates at pressures under atmospheric and/or with steam. The heavy alkylates are obtained as bottoms from the distillation of alkylates, and may constitute 5–20% of the whole alkylates. Alkylates are produced by the alkylation of olefins with alkanes. An example of such material would be the product of the alkylation of isobutylene with isobutane in the presence of hydrofluoric acid.

What is claimed is:

1. The method of preparing stable, odor-free naphthas from essentially odorless hydrocarbon mixtures which comprises distilling said hydrocarbon mixtures in the presence of a small amount of phenothiazine and separating an odor-free hydrocarbon distillate.

2. The method in accordance with claim 1 in which the hydrocarbon mixture is a heavy naphtha boiling in the range of about 340 to 600° F.

3. The method in accordance with claim 1 in which the hydrocarbon mixture comprises a heavy alkylate fraction boiling within the range of about 347° to 577° F.

4. The method in accordance with claim 1 in which the distillation is conducted at subatmospheric pressure.

5. The method in accordance with claim 4 in which the pressure varies from about one to 300 mm. Hg, and about 20 to 200 weight percent of an inert gaseous or vaporizable diluent is present during the distillation.

6. The method in accordance with claim 5 in which the diluent is steam.

7. The method in accordance with claim 5 in which the diluent is nitrogen.

8. The method in accordance with claim 1 in which said phenothiazine is present in a concentration of at least 0.1 lb. per 1000 bbls. of hydrocarbon mixture.

9. The method of preparing stable, odor-free naphthas from essentially odorless hydrocarbon mixtures which comprises distilling said hydrocarbon mixtures in the presence of between about 0.1 lb. to about 5 lbs. of phenothiazine per 1000 bbls. of said hydrocarbon mixtures.

10. The method in accordance with claim 9 in which the hydrocarbon mixture is a heavy naphtha boiling in the range of about 340° to 600° F.

11. The method in accordance with claim 1 in which the hydrocarbon mixture comprises a heavy alkylate fraction boiling within the range of about 347° to 577° F.

References Cited in the file of this patent

UNITED STATES PATENTS

| | | |
|---|---|---|
| 2,190,648 | Cantrell et al. | Feb. 20, 1940 |
| 2,280,227 | Gillespie | Apr. 21, 1942 |
| 2,882,232 | Haines et al. | Apr. 14, 1959 |